US008655607B2

(12) United States Patent
Makida et al.

(10) Patent No.: US 8,655,607 B2
(45) Date of Patent: Feb. 18, 2014

(54) SENSING DEVICE, SENSING METHOD, AND COMPUTER-READABLE STORAGE MEDIUM

(75) Inventors: Seigo Makida, Kanagawa (JP); Shoji Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 383 days.

(21) Appl. No.: 13/095,436

(22) Filed: Apr. 27, 2011

(65) Prior Publication Data

US 2012/0150457 A1 Jun. 14, 2012

(30) Foreign Application Priority Data

Dec. 10, 2010 (JP) ................................ 2010-275881

(51) Int. Cl.
*G06F 19/00* (2011.01)
*G01B 7/00* (2006.01)

(52) U.S. Cl.
USPC ........................................ 702/57; 324/207.15

(58) Field of Classification Search
USPC ............................................................ 702/57
See application file for complete search history.

(56) References Cited

U.S. PATENT DOCUMENTS 6,020,856 A 2/2000 Alicot
6,081,238 A 6/2000 Alicot
6,879,160 B2 * 4/2005 Jakab ........................... 324/318
8,076,010 B2 * 12/2011 Fuse et al. .................. 428/692.1

FOREIGN PATENT DOCUMENTS

JP A-11-506279 6/1999

* cited by examiner

*Primary Examiner* — Bryan Bui
(74) *Attorney, Agent, or Firm* — Oliff PLC

(57) ABSTRACT

A sensing device includes: a magnetic field generating coil that generates an alternating magnetic field in a sensing-target region; a signal inducing coil in which is induced an electric signal corresponding to the alternating magnetic field generated by the magnetic field generating coil; an amplifier that amplifies a third electric signal obtained from the difference between a first electric signal induced in the signal inducing coil in a state where a sensing-target magnetic body is present in the sensing-target region and a second electric signal induced in the signal inducing coil in a state where the magnetic body is not present in the sensing-target region; and a sensing unit that senses, on the basis of the third electric signal amplified by the amplifier, the magnetic body passing through the sensing-target region by sensing a change in the magnetic field resulting from magnetization reversal of the magnetic body.

9 Claims, 12 Drawing Sheets

SENSING DEVICE, SENSING METHOD, AND COMPUTER-READABLE STORAGE MEDIUM

CROSS-REFERENCE TO RELATED APPLICATION

This application is based on and claims priority under 35 USC 119 from Japanese Patent Application No. 2010-275881 filed on Dec. 10, 2010.

BACKGROUND

1. Technical Field

The present invention relates to a sensing device, a sensing method, and a computer-readable storage medium.

2. Related Art

There are known technologies for sensing devices that detect erroneous sensing.

SUMMARY

A sensing device pertaining to a first aspect of the present invention includes: a magnetic field generating coil that generates an alternating magnetic field in a sensing-target region; a signal inducing coil in which is induced an electric signal corresponding to the alternating magnetic field generated by the magnetic field generating coil; an amplifier that amplifies a third electric signal obtained from the difference between a first electric signal induced in the signal inducing coil in a state where a sensing-target magnetic body is present in the sensing-target region and a second electric signal induced in the signal inducing coil in a state where the magnetic body is not present in the sensing-target region; and a sensing unit that senses, on the basis of the third electric signal amplified by the amplifier, the magnetic body passing through the sensing-target region by sensing a change in the magnetic field resulting from magnetization reversal of the magnetic body.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail below with reference to the drawings.

First, the configuration of the sensing device pertaining to the present exemplary embodiment will be described with reference to FIG. 1. The sensing device pertaining to the present exemplary embodiment senses whether or not a tag in which a magnetic body having a large Barkhausen effect is embedded has passed and issues an alarm in a case where the tag has passed.

Figure 1:
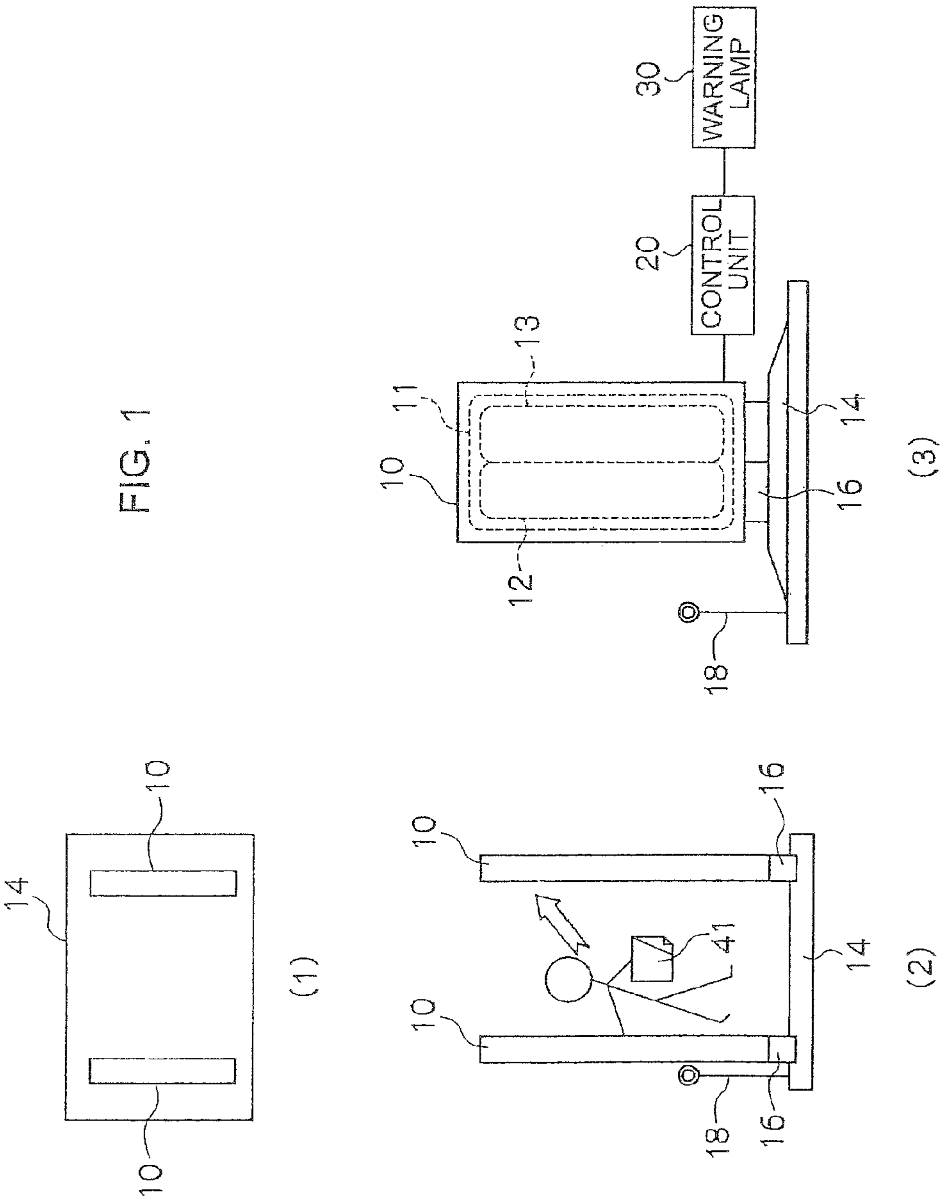
FIG. 1 shows a plan view, a front view and a side view of the overall configuration of a sensing device pertaining to the exemplary embodiment.

As shown in FIG. 1, the sensing device pertaining to the present exemplary embodiment is equipped with two opposing security gates 10, a support stand 14 that supports the two security gates 10 such that the two security gates 10 are face-to-face and parallel to one another, a control unit 20 that controls the action of each of the security gates 10, and a warning lamp 30 form which light is emitted in a case where passage of the tag has been sensed. The control unit 20 may be disposed inside either of the two security gates 10, inside the support stand 14, or separate from the two security gates 10. Moreover, the warning lamp 30 may also be disposed in either of the two security gates 10 or separate from the two security gates 10.

Further, in the sensing device pertaining to the present exemplary embodiment, adjustment members 16 are disposed between the security gates 10 and the support stand 14 so that the height of the security gates 10 can be adjusted.

Here, in the sensing device pertaining to the present exemplary embodiment, the space between the two security gates 10 is configured to serve as a sensing region in which the sensing device senses the tag. Additionally, in the present exemplary embodiment, the tag is attached to, and integrated with, an article 41 such as an important document that is prohibited from being taken out. The security gates 10 are installed in an entrance/exit of a space in which the article 41 is kept. Because of this, the warning lamp 30 is lit up when the article 41 is taken out of the space; as a result, the article 41 is restricted from being taken out.

Here, each of the security gates 10 pertaining to the present exemplary embodiment is equipped with an exciting coil 11 that generates an alternating magnetic field and sensing coils 12 and 13 that are induced by a magnetic field from the outside and through which electric currents flow. In the sensing device pertaining to the present exemplary embodiment, the sensing coils 12 and 13 are symmetrically disposed side-by-side in the transverse direction.

Further, in the sensing device pertaining to the present exemplary embodiment, a presence sensor 18 is disposed near the end portion of the support stand 14 inside the space in order to detect passage of a person. The presence sensor 18 may be a passive sensor that detects a person by receiving the infrared radiation emitted from the surface of the person's body or, for example, an active sensor that emits an infrared beam and detects an object that reflects or blocks the infrared beam.

Figure 2:
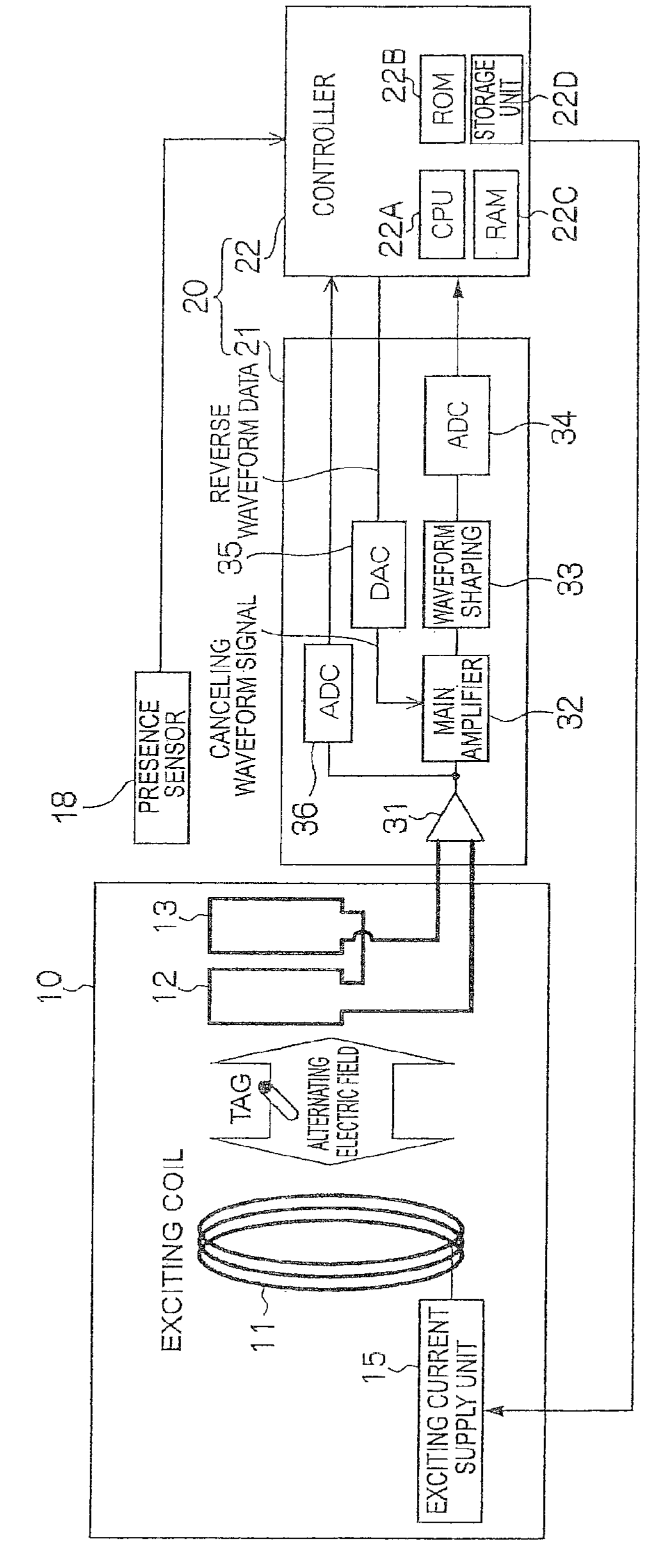
FIG. 2 is a block diagram showing the main electrical configuration of the sensing device pertaining to the exemplary embodiment.

FIG. 2 shows the main electrical configuration of the sensing device pertaining to the present exemplary embodiment.

As shown in FIG. 2, the sensing device pertaining to the present exemplary embodiment is equipped with an exciting current supply unit 15 that supplies an exciting current for generating a magnetic field to the exciting coil 11, a signal processor 21 that converts analog electric signals induced in the sensing coils 12 and 13 into digital data, and a controller 22 that senses passage of the tag on the basis of the digital data obtained by the signal processor 21.

Here, the sensing coils 12 and 13 are adjacent to each other on a plane and are placed such that their winding directions are opposite. One end portion of the sensing coil 12 is connected to the signal processor 21, and the other end portion of the sensing coil 12 is connected to one end portion of the sensing coil 13. The other end portion of the sensing coil 13 is connected to the signal processor 21.

The controller 22 is configured by a microcomputer, is equipped with a central processing unit (CPU) 22A, a read-only memory (ROM) 22B, a random access memory (RAM) 22C, and a nonvolatile storage unit 22D comprising a flash memory or the like, and controls the actions of the entire sensing device.

Further, the exciting current supply unit 15 supplies an alternating exciting current to the exciting coil 11 in accordance with control from the controller 22.

The exciting coil 11 is excited as a result of the exciting current being supplied thereto from the exciting current supply unit 15 and generates the alternating magnetic field in which the magnetic field changes like a sine wave. In the sensing coils 12 and 13, alternating currents are induced by the alternating magnetic field generated by the exciting coil 11 and, in a case where the tag including the magnetic body having the large Barkhausen effect is present in the alternating magnetic field, pulse currents arise because of magnetization reversal.

Figure 3:
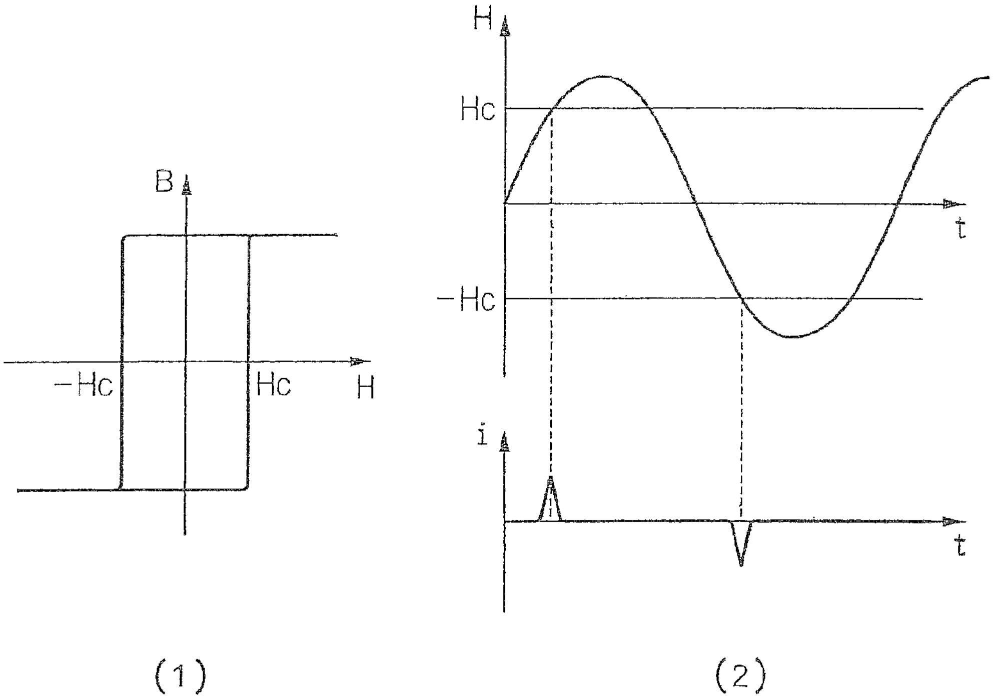
FIG. 3 is shows waveform diagrams for describing a large Barkhausen effect.

FIG. 3 shows diagrams for describing the large Barkhausen effect.

The large Barkhausen effect is a phenomenon where precipitous magnetization reversal occurs when a material with the B-H characteristic shown in FIG. 3(1)—that is, whose hysteresis loop is substantially rectangular and whose coercive force (Hc) is relatively small—such as an amorphous magnetic material comprising Co—Fe—Ni—B—Si, for example, is placed in an alternating magnetic field. The magnetic body having the large. Barkhausen effect undergoes magnetization reversal when a magnetic field of greater intensity than positive and negative predetermined intensities acts thereon. For this reason, when the exciting current flows in the exciting coil 11, the exciting coil 11 generates the alternating magnetic field, and the tag is placed in that alternating magnetic field, pulse currents flow in the sensing coils 12 and 13 placed near the tag at the time of the magnetization reversal.

For example, in a case where the alternating magnetic field shown in the upper part of FIG. 3(2) has been generated by the exciting coil 11, the pulse current shown in the lower part of FIG. 3(2) as one example flows in the sensing coils 12 and 13.

However, the currents in the sensing coils 12 and 13 include not only this pulse current but also alternating currents induced by the alternating magnetic field. In the sensing device pertaining to the present exemplary embodiment, the sensing coils 12 and 13 are connected such that their winding directions are opposite in order to offset the alternating currents induced in the sensing coils 12 and 13.

Examples of the material (magnetic material) of the magnetic body included in the tag typically include permanent magnets—for example: rare-earth magnets whose principal components are neodymium (Nd), iron (Fe), and boron (B) and rare-earth magnets whose principal components are samarium (Sm) and cobalt (Co); alnico magnets whose principal components are aluminum (Al), nickel (Ni), and cobalt (Co); and ferrite magnets whose principal components are barium (Ba) or strontium (Sr) and iron(III) oxide ($Fe_2O_3$)—and also soft magnetic materials and oxide soft magnetic materials. As the magnetic material that produces the large Barkhausen effect, an amorphous magnetic material whose basic composition is Fe—Co—Si or Co—FeNi may be used.

The shape of the magnetic material is not particularly limited as long as it is a shape suitable for producing the large Barkhausen effect. However, because a length corresponding to cross-sectional area becomes necessary in order to produce the large Barkhausen effect, the magnetic material may be given a wire shape or a band shape, but it is preferred that the magnetic material has a wire shape.

In a case where the magnetic material has a wire shape, the minimum diameter needed in order to produce the large Barkhausen effect may be 10 μm or more. The maximum diameter is not particularly limited, but in a case where the magnetic material is put into and integrated with a recording medium (paper), for example, the diameter of the magnetic material is dependent on the thickness of the recording medium in order to control exposure of the magnetic material to the surface of the recording medium, and in the case of a recording medium with a thickness of around 90 μm, for example, it is preferred that the diameter of the magnetic material be 60 μm or less and it may also be 50 μm or less.

As for the length of the magnetic material, the minimum length needed in order to produce the large Barkhausen effect may be 5 mm or more. It suffices for the maximum length of the amorphous magnetic material to be a length where the magnetic material does not become exposed from the recording medium when the amorphous magnetic material is included inside the recording medium. The maximum length of the amorphous magnetic material is not particularly limited and may be 430 mm or less.

As shown in FIG. 2, the signal processor 21 is equipped with a differential amplifier 31 that amplifies and outputs the differential of the voltages between both terminals (the signal voltages respectively outputted from the one end portion of the sensing coil 12 and the other end portion of the sensing coil 13), a main amplifier 32 that amplifies by a predetermined gain the signal outputted from the differential amplifier 31, a waveform shaping circuit 33 that shapes the waveform of the signal outputted from the main amplifier 32, and an analog-to-digital converter (abbreviated as "ADC" below) 34 that converts the signal whose waveform has been shaped by the waveform shaping circuit 33 into digital data. The signal processor 21 may also be configured to further include, between the waveform shaping circuit 33 and the ADC 34, a band-pass filter that extracts and outputs, from the signal obtained by the waveform shaping circuit 33, a signal in a predetermined band corresponding to the pulse currents produced by the magnetization reversal of the magnetic body. In the sensing device pertaining to the present exemplary embodiment, the main amplifier 32 is an inverting amplifier, but the main amplifier 32 is not limited to this and may also be another kind of amplifier such as a non-inverting amplifier.

The controller 22 senses passage of the tag by determining whether or not the level of the digital data outputted from the ADC 34 exceeds a threshold value or by determining whether or not the waveform shape of that digital data is a waveform shape resulting from magnetization reversal of the magnetic body by cross-correlation or the like that determines this on the basis of a cross-correlation value with a standard waveform shape predetermined as representing a waveform shape resulting from that magnetization reversal. In a case where passage of the tag has been sensed, the controller 22 causes the warning lamp 30 to light up. The sensing device pertaining to the present exemplary embodiment senses passage of the tag by cross-correlation.

The presence sensor 18 is connected to the controller 22, and the result of the detection of a person by the presence sensor 18 is grasped by the controller 22.

Incidentally, the sensing device pertaining to the present exemplary embodiment has a background noise removing function of removing background noise, which is noise that ends up being superimposed on the alternating currents induced in the sensing coils 12 and 13. Here, the background noise is noise that affects the sensing signals resulting from the sensing coils 12 and 13 of the sensing device depending on changes in the operating states of peripheral devices and in the layout of those peripheral devices, iron doors, fire extinguishers, and so forth. For this reason, the background noise removing function pertaining to the present exemplary embodiment is configured to continually sense the background noise and remove that background noise from the sensing signals that are obtained when a person passes between the security gates 10.

There are two types of the background noise: noise that is superimposed on the sensing signals resulting from the sensing coils 12 and 13 even in a state where the exciting current is not supplied to the exciting coil 11 and noise that is superimposed on the sensing signals resulting from the sensing coils 12 and 13 in a state where the exciting current has been supplied to the exciting coil 11.

Here, the former type of noise includes, as one example, noise at a time when an air conditioner is operating as one example. The operating state of an air conditioner during operation constantly changes. For this reason, the noise resulting from that air conditioner constantly changes. The latter type of noise includes, as one example, noise generated by metal objects such as a door or a fire extinguisher installed in the surrounding area because of the magnetic field generated by the exciting coil 11. With this type of noise, oftentimes the metal objects that are the source of the noise are fixed, but when the metal objects are moved, the state of that noise changes.

Figure 4:
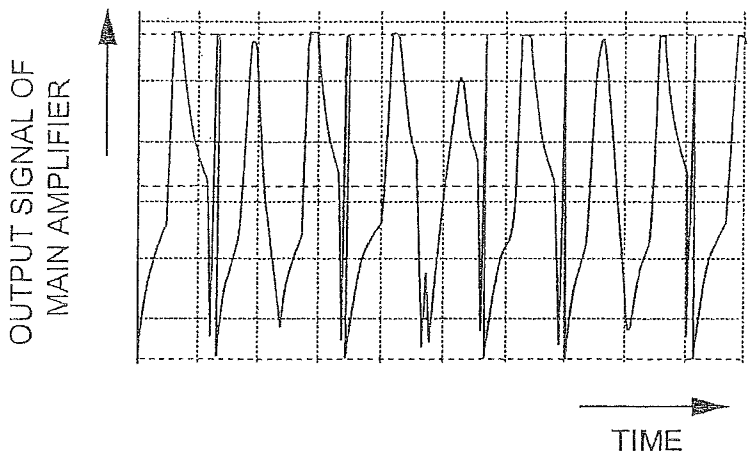
FIG. 4 is a waveform diagram for describing a problem in a conventional sensing device.

In the sensing device pertaining to the present exemplary embodiment, as a result of this background noise being superimposed on the sensing signals, as shown in FIG. 4 as one example, sometimes the output signal from the main amplifier 32 ends up becoming saturated and the tag is not sensed.

The background noise removing function is for preventing erroneous sensing of the tag caused by the above background noise. In order to realize this background noise removing function, the main amplifier 32 pertaining to the present exemplary embodiment is configured as shown in FIG. 5 as one example.

Figure 5:
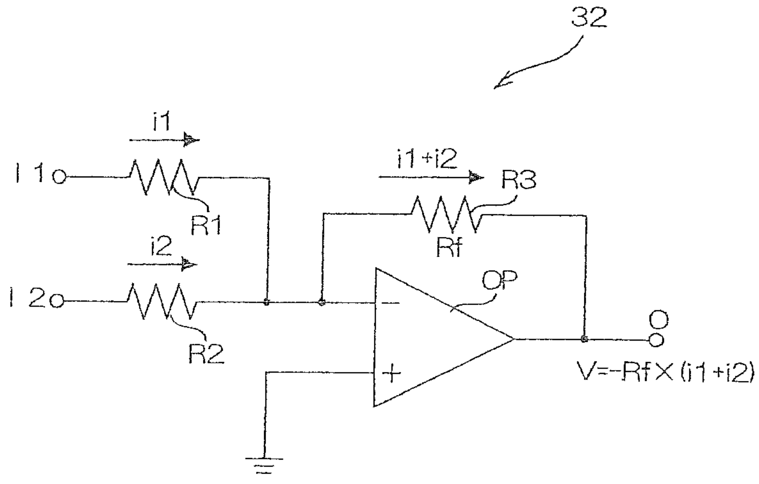
FIG. 5 is a circuit diagram showing the configuration of an amplifier pertaining to the exemplary embodiment.

As shown in FIG. 5, the main amplifier 32 pertaining to the present exemplary embodiment is equipped with an op-amp OP. The inverting input terminal of the op-amp OP is branched into two, with one being connected to one input terminal I1 via a resistor R1 and the other being connected to another input terminal I2 via a resistor R2. The non-inverting terminal of the op-amp OP is grounded, and the output terminal O is connected to the inverting input terminal of the op-amp OP via a resistor R3.

The input terminal I1 is connected to the controller 22, and a later-described canceling waveform signal, which is a signal that removes (cancels) the background noise, is inputted to the input terminal I1 from the controller 22. The input terminal I2 is connected to the output terminal of the differential amplifier 31, and the sensing signal amplified by the differential amplifier 31 is inputted to the input terminal I2 from the differential amplifier 31. The output terminal O is connected to the input terminal of the waveform shaping circuit 33.

Figure 6:
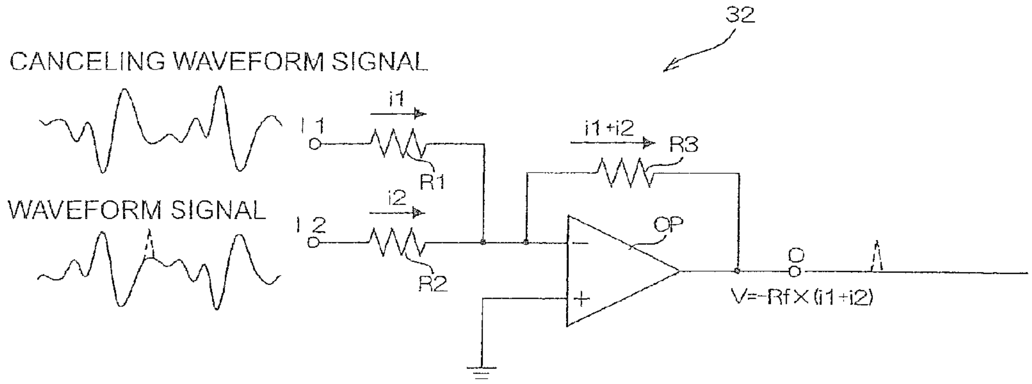
FIG. 6 is a schematic diagram (a partial circuit diagram) for describing an action of the amplifier pertaining to the exemplary embodiment.
Figure 7:
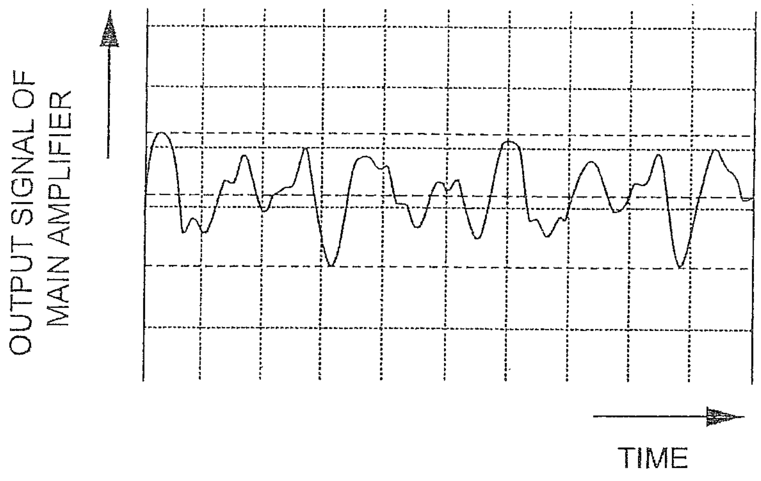
FIG. 7 is a waveform diagram showing an example of an output signal of the amplifier pertaining to the exemplary embodiment.

Consequently, in the main amplifier 32 pertaining to the present exemplary embodiment, as shown in FIG. 6 as one example, the canceling waveform signal and the sensing signal are superimposed, and a sensing signal from which the background noise has been removed (canceled) is inputted to the inverting input terminal of the op-amp OP. As a result, as shown in FIG. 7 as one example, saturation of the main amplifier 32 is prevented. FIG. 7 shows, in a range identical to the one in FIG. 4, a waveform diagram of the output signal from the main amplifier 32 in a case where the sensing device has the background noise removing function as compared to FIG. 4, which shows a waveform diagram of the output signal from the main amplifier 32 in a case where the sensing device does not have the background noise removing function.

Incidentally, the sensing device pertaining to the present exemplary embodiment obtains the canceling waveform signal by converting later-described reverse waveform data, which is digital data outputted from the controller 22, into an analog signal. For this reason, as shown in FIG. 2, a digital-to-analog converter (abbreviated as "DAC" below) 35 is disposed in the signal processor 21, and the controller 22 is connected to the main amplifier 32 via the DAC 35.

Further, the sensing device pertaining to the present exemplary embodiment creates the later-described reverse waveform data on the basis of the sensing signal outputted from the differential amplifier 31. For this reason, as shown in FIG. 2, an ADC 36 is disposed in the signal processor 21, and the output terminal of the differential amplifier 31 is also connected to the controller 22 via the ADC 36.

Although it is not shown, the sensing device pertaining to the present exemplary embodiment is equipped with a camera that images the sensing region resulting from the sensing device (the space between the security gates 10). The sensing device also has an automatic imaging function of imaging the sensing region with this camera only when a person passes through the sensing region. The presence sensor 18 is disposed in order to define the timing for executing this automatic imaging function and later-described passage-of-moving-body interrupt processing for sensing whether or not the tag is passing through the sensing region.

Moreover, as mentioned before, the sensing device pertaining to the present exemplary embodiment senses passage of the tag by cross-correlation, so in the sensing device pertaining to the present exemplary embodiment, digital data representing the standard waveform shape predetermined as representing the waveform shape resulting from the magnetization reversal (called "standard waveform data" below) is stored beforehand in a predetermined region of the storage unit 22D.

Each type of processing for realizing the background noise removing function and the automatic imaging function resulting from the sensing device configured as described above may be realized by a software configuration utilizing a computer by executing programs. However, it is not limited to being realized by a software configuration and may also be realized by a hardware configuration or a combination of a hardware configuration and a software configuration.

A case where the sensing device pertaining to the present exemplary embodiment is configured to realize each type of processing by executing the programs will be described below. In this case, the sensing device may have a configuration where the programs are installed beforehand in the controller 22 of the sensing device, a configuration where the programs are provided in a state where they are stored in a computer-readable recording medium, or a configuration where the programs are delivered via wired or wireless communicating means.

Next, the action when executing the processing relating to the background noise removing function particularly relating to the present invention will be described as the action of the sensing device pertaining to the present exemplary embodiment. Here, in order to avoid confusion, a case where the sensing device senses passage of the tag using only one of the security gates 10 will be described.

Figure 8:
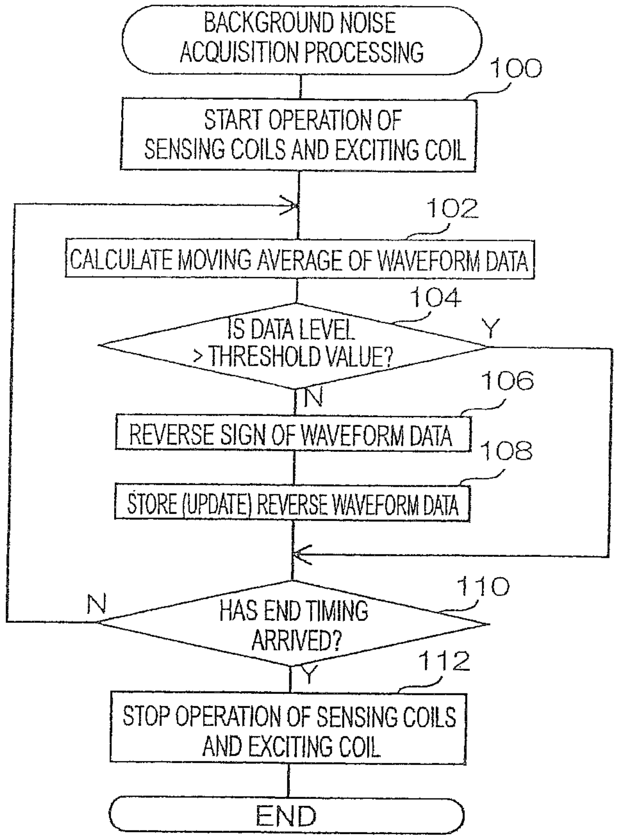
FIG. 8 is a flowchart showing a flow of processing by a background noise acquisition processing program pertaining to the exemplary embodiment.

In the sensing device pertaining to the present exemplary embodiment, background noise acquisition processing and the passage-of-moving-body interrupt processing are executed in order to realize the background noise removing function. Therefore, first, the action of the sensing device when executing the background noise acquisition processing will be described with reference to FIG. 8. FIG. 8 is a flowchart showing a flow of processing by a background noise acquisition processing program that is executed by the CPU 22A of the controller 22 when an unillustrated power switch of the sensing device is switched on. This program is stored beforehand in the ROM 22B.

First, in step 100 in FIG. 8, the CPU 22A performs control so as to start operation of the signal processor 21 in order to start the sensing action resulting from the sensing coils 12 and 13, and the CPU 22A also controls the exciting current supply unit 15 so as to start supply of the exciting current to the exciting coil 11. In the next step 102, the CPU 22A calculates the moving average, in a predetermined cycle (in the present exemplary embodiment, one cycle of the exciting current supplied to the exciting coil 11), of a predetermined first period (in the present exemplary embodiment, 5 seconds) of the digital data being outputted from the ADC 36. In the sensing device pertaining to the present exemplary embodiment, the CPU 22A stores a predetermined period's worth (in the present exemplary embodiment, 5 seconds' worth) of the latest digital data in the RAM 22C. In step 102, the CPU 22A calculates the moving average of the period going back the first period using this stored digital data.

In the next step 104, the CPU 22A determines whether or not a predetermined data level (in the present exemplary embodiment, a maximum level) in the digital data averaged by the processing in step 102 (called "first waveform data" below) exceeds a predetermined threshold value. When the determination is YES, the CPU 22A moves to later-described step 110. When the determination is NO, the CPU 22A moves to step 106. The processing of step 104 is processing for determining whether or not the tag is passing through the sensing region. In the sensing device pertaining to the present exemplary embodiment, as the threshold value used in the processing of step 104, a level lower by a predetermined level (in the present exemplary embodiment, a level of one tenth the data level) than the data level is applied as the level at which the predetermined data level in the first waveform data obtained when the tag is passing through the sensing region is sensed.

In step 106, the CPU 22A reverses the sign of the first waveform data obtained by the processing of step 102. In the next step 108, the CPU 22A stores the reversed waveform data (called "reverse waveform data" below) in a predetermined region of the storage unit 22D.

In the next step 110, the CPU 22A determines whether or not a timing predetermined as a timing for ending the background noise acquisition processing program has arrived. When the determination is NO, the CPU 22A returns to step 102. At the point in time when the determination becomes YES, the CPU 22A moves to step 112. In the sensing device pertaining to the present exemplary embodiment, the timing when the unillustrated power switch of the sensing device is switched off is applied as the predetermined timing, but the predetermined timing is not limited to this. For example, the sensing device may also be given a configuration that applies a timing when a time predetermined as a time for ending the operation of the sensing device has arrived or a timing when an instruction operation instructing the end of the background noise acquisition processing program has been performed by the user.

In step 112, the CPU 22A performs control so as to stop the operation of the signal processor 21 and the supply of the exciting current to the exciting coil 11 that were started by the processing in step 100. Thereafter, the CPU 22A ends the background noise acquisition processing program.

Figure 9:
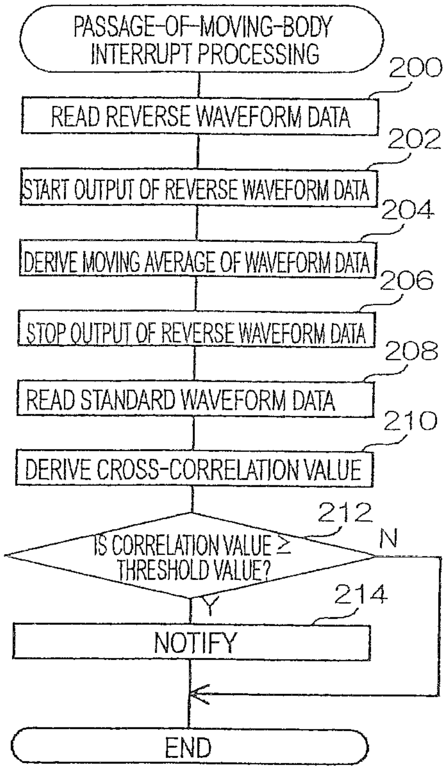
FIG. 9 is a flowchart showing a flow of processing by a passage-of-moving-body interrupt processing program pertaining to the exemplary embodiment.

Next, the action of the sensing device when executing the passage-of-moving-body interrupt processing will be described with reference to FIG. 9. FIG. 9 is a flowchart showing a flow of processing by a passage-of-moving-body interrupt processing program that is executed as interrupt processing by the CPU 22A of the controller 22 when a person has been detected by the presence sensor 18. This program is stored beforehand in the ROM 22B.

First, in step 200 in FIG. 9, the CPU 22A reads the reverse waveform data from the storage unit 22D. In the next step 202, the CPU 22A starts output of the reverse waveform data it has read to the DAC 35. In step 202, it is necessary to superimpose, at a synchronized timing, the sensing signal outputted from the differential amplifier 31 and the canceling waveform signal outputted from the DAC 35 in order to realize the background noise removing function, so the CPU 22A is configured to repeatedly input the reverse waveform data to the DAC 35 at a timing predetermined to result in the synchronized timing.

In the next step 204, the CPU 22A calculates, like in the processing of step 102 of the background noise acquisition processing program, the moving average, in the predetermined cycle, of the predetermined first period of the digital data being outputted from the ADC 34. In the next step 206, the CPU 22A stops the output of the reverse waveform data to the DAC 35 that was started by the processing of step 202.

In the next step 208, the CPU 22A reads the standard waveform data from the storage unit 22D. In the next step 210, the CPU 22A calculates the cross-correlation value between the standard waveform data it has read and the digital data that was averaged by the processing of step 204 (called "second waveform data" below).

In the next step 212, the CPU 22A determines whether or not the cross-correlation value calculated by the processing of step 210 is equal to or greater than a predetermined threshold value. When the determination is NO, the CPU 22A ends the passage-of-moving-body interrupt processing program. When the determination is YES, the CPU 22A moves to step 214. In the sensing device pertaining to the present exemplary embodiment, as the threshold value used in the processing of step 212, depending on the purpose of the sensing device and the tag sensing precision required of the sensing device, the sensing device uses a value obtained beforehand by an experiment using an actual machine or a computer simulation based on the specifications of an actual machine as a value regarded as indicating that the tag has passed through the sensing region in a case where the cross-correlation value serving as the comparison target is equal to or greater than that value.

In step 214, the CPU 22A provides notification that passage of the tag has been sensed by causing the warning lamp

30 to emit light. Thereafter, the CPU 22A ends the passage-of-moving-body interrupt processing program.

The present invention has been described above using an exemplary embodiment, but the technical scope of the present invention is not limited to the scope described in the above exemplary embodiment. Various changes or improvements can be made to the above exemplary embodiment in a scope that does not depart from the gist of the invention, and embodiments to which such changes or improvements have been made are also included in the technical scope of the present invention.

Further, the exemplary embodiment is not intended to limit the inventions pertaining to the claims, and not all combinations of features described in the above exemplary embodiment are required for the solving means of the present invention. Inventions of various stages are included in the exemplary embodiment, and various inventions may be extracted by combining the multiple components that are disclosed. Even if several components are omitted from all of the components described in the exemplary embodiment, configurations from which those several components have been omitted may be extracted as inventions as long as effects are obtained.

For example, in the above exemplary embodiment, a case where the presence sensor 18 is applied as the detecting means of the present invention has been described, but the present invention is not limited to this and may also, for example, be given a configuration where an object detecting sensor that detects other objects in addition to humans is applied.

Further, in the above exemplary embodiment, a case where the presence sensor 18 is disposed inside the space bounded by the security gates 10 and out of which the tag is restricted from being taken has been described, but the present invention is not limited to this and may also, for example, be given a configuration where the security gates 10 are disposed in the entrance/exit of a space into which the tag is restricted from being brought and where the presence sensor 18 is disposed outside that space bounded by the security gates 10 or a configuration where the security gates 10 are disposed in the entrance/exit of a space out of which the tag is restricted from being taken and into which the tag is restricted from being brought and where the presence sensor 18 is disposed both inside and outside that space bounded by the security gates 10.

Further, in the above exemplary embodiment, a case where the sensing device acquires the reverse waveform data in a case where the data level of the waveform data representing the sensed waveform signal is equal to or less than a predetermined threshold value has been described, but the present invention is not limited to this and may also be given a configuration where the sensing device acquires the reverse waveform data at a timing when passage of a person through the sensing region is not being detected by the presence sensor 18.

Further, in the above exemplary embodiment, a case where the sensing signal and the canceling waveform signal are superimposed between the differential amplifier 31 and the main amplifier 32 has been described, but the present invention is not limited to this and may also be given a configuration where the sensing signal and the canceling waveform signal are superimposed between the sensing coils 12 and 13 and the differential amplifier 31.

Further, in the above exemplary embodiment, a case where two amplifiers—the differential amplifier 31 and the main amplifier 32—are cascade-connected and applied as amplifiers that amplify the sensing signal has been described, but the present invention is not limited to this and may also, for example, be given a configuration where three or more amplifiers are cascade-connected and applied. In this case, the position at which the sensing signal and the canceling waveform signal are superimposed may be between the sensing coils 12 and 13 and the differential amplifier 31 and any position on the connection line between the amplifiers.

Further, in the above exemplary embodiment, a case where the sensing signal and the canceling waveform signal are superimposed in a state where the sign of the canceling waveform signal has been reversed has been described, but the present invention is not limited to this and may also, for example, be given a configuration where waveform data representing the sensing signal in a case where the tag is not passing through the sensing region (called "canceling waveform data" below) is stored and the difference between the waveform data representing the sensing signal in a case where a moving body is passing through the sensing region and the canceling waveform data is calculated.

Further, in the above exemplary embodiment, a case where the sensing device senses the tag using only one of the security gates 10 of the sensing device has been described, but the present invention is not limited to this and may also, for example, be given a configuration where the sensing device senses the tag using both of the security gates 10. In this case, the sensing device may be given a configuration where it issues an alarm in a case where the tag has been sensed by either one of the security gates 10 or a configuration where it issues an alarm only in a case where the tag has been sensed by both of the security gates 10.

Figure 10:
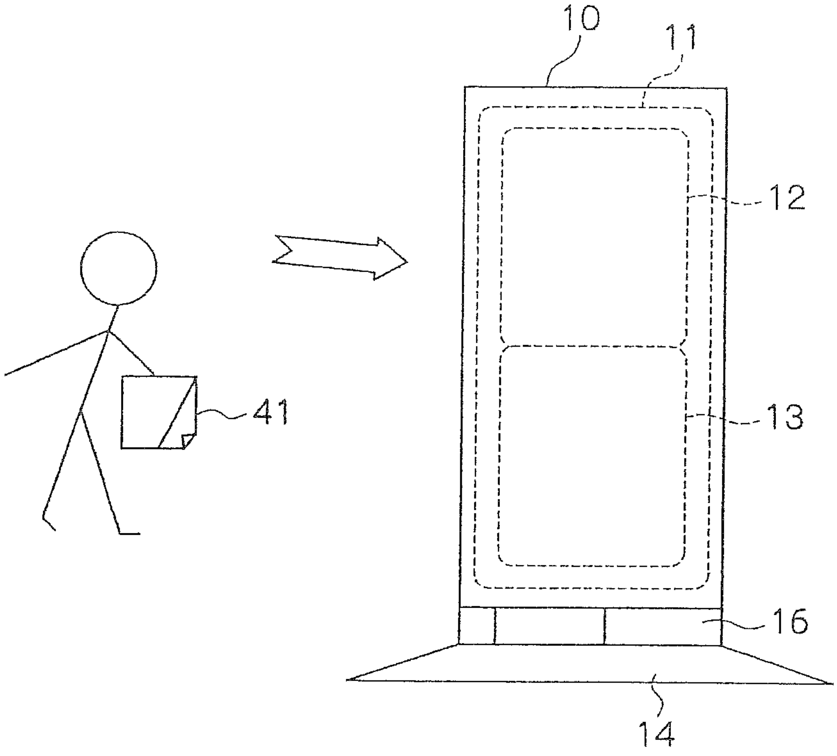
FIG. 10 is a side view showing an example of another configuration of the sensing device pertaining to the exemplary embodiment.

Further, in the above exemplary embodiment, a case where the pair of sensing coils 12 and 13 are placed in the transverse direction has been described, but the present invention is not limited to this and may also, for example, be given a configuration where, as shown in FIG. 10 as one example, the sensing coils 12 and 13 are placed in the vertical direction or another configuration where the sensing coils are placed so as to be adjacent to each other on a plane and are connected such that their winding directions are opposite.

Further, in the above exemplary embodiment, a case where data obtained by a moving average per predetermined period is applied as each of the first waveform data and the second waveform data has been described, but the present invention is not limited to this and may also, for example, be given a configuration where instantaneous waveform data is applied without calculating the moving average.

Further, in the above exemplary embodiment, a case where the sensing device provides notification of the passage of the tag by causing the warning lamp 30 to emit light has been described, but the present invention is not limited to this and may also, for example, be given a configuration where the sensing device provides notification by audio with a speaker or the like, provides notification by an external device via a communication line or the like, or provides notification in another way.

Further, in the above exemplary embodiment, a case where the sensing coils 12 and 13 are connected such that their winding directions are opposite and where the alternating currents induced by the alternating magnetic field in the sensing coils 12 and 13 are canceled out has been described, but the present invention is not limited to this and may also, for example, be given a configuration where the sensing device digitally converts the analog signals of the sensing coils 12 and 13, thereafter obtains the difference, and cancels out the alternating currents. Further, it is not invariably necessary for there to be two sensing coils, and the sensing device may also be given a configuration where it has only one sensing coil.

Further, in the above exemplary embodiment, a case where two of the security gates 10 are disposed in the sensing device has been described, but the present invention is not limited to this and may also be given a configuration where only one of the security gates 10 is disposed or a configuration where three or more of the security gates 10 are disposed.

Figure 11:
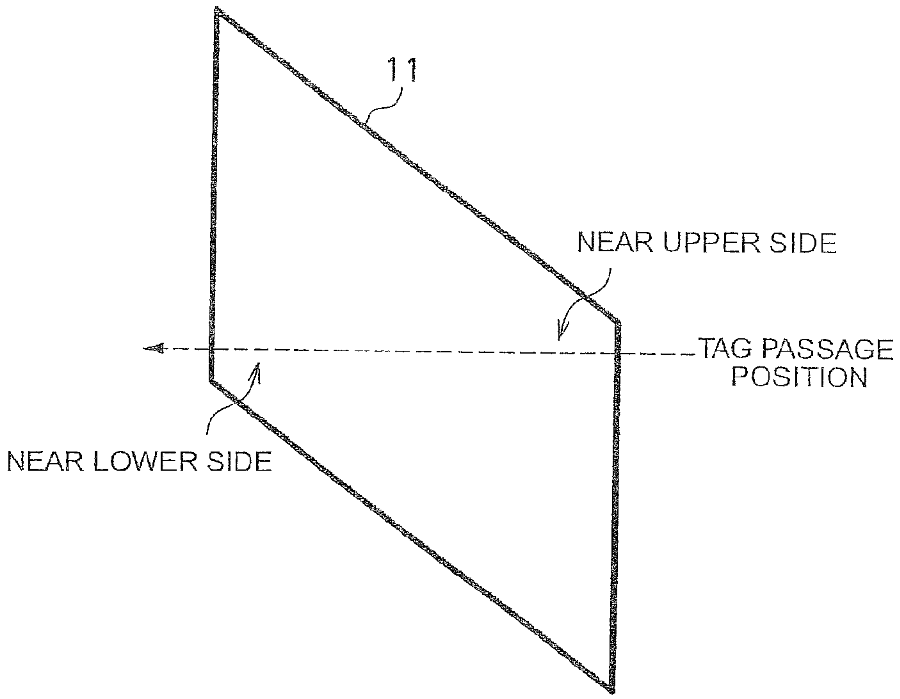
FIG. 11 is a side view showing an example of another configuration of an exciting coil pertaining to the exemplary embodiment.

Further, in the above exemplary embodiment, a case where the exciting coil 11 is given a rectangular shape has been described, but the present invention is not limited to this. For example, as shown in FIG. 11, the exciting coil 11 may also be given a parallelogram shape. In this case, sensing of the tag becomes easy to perform because, even if the tag moves horizontally, it becomes closer to the upper side or the lower side while moving.

Further, in the above exemplary embodiment, a case where the sensing device automatically senses that the timing when it should sense the reverse waveform data has arrived by determining whether or not the data level of the first waveform data exceeds a predetermined threshold value has been described, but the present invention is not limited to this and may also be given a configuration where the user performs a predetermined instruction operation in a case where it is conceivable that the background noise has changed as a result of the layout or the operating states of peripheral devices changing and the sensing device senses that the timing when it should sense the reverse waveform data has arrived by sensing that the instruction operation has been performed by the user.

Figure 12:
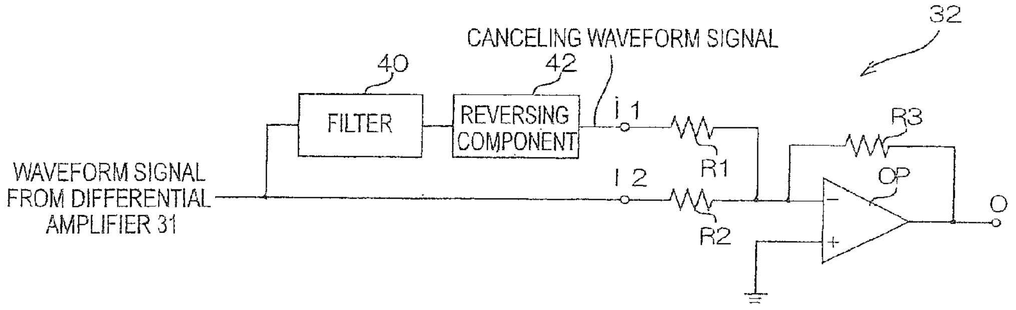
FIG. 12 is a block diagram (a partial circuit diagram) showing an example of another configuration of the sensing device pertaining to the exemplary embodiment.

Further, in the above exemplary embodiment, a case where the reverse waveform data is stored beforehand in the storage unit 22D and the sensing device realizes the background noise removing function by using that reverse waveform data has been described, but the present invention is not limited to this and may also be given a configuration where, as shown in FIG. 12 as one example, the sensing device realizes the background noise removing function without using the storage unit by cascade-connecting and using a filter 40 that cuts signals in a band corresponding to the pulse currents produced by the magnetization reversal of the tag and a reversing component 42 that inverts the sign of the sensing signal obtained by the filter 40. In the case of the configuration shown in FIG. 12, the sensing device may be given a configuration where a signal delaying element such as a delay line is disposed in front of the resistor R2 in consideration of the delay of the canceling waveform signal caused by the filter 40 and the reversing component 42.

In addition, the configuration of the sensing device described in the above exemplary embodiment (see FIG. 1 and FIG. 2) is one example, and unwanted portions may be omitted therefrom and new portions may be added thereto in a scope that does not depart from the gist of the present invention.

Moreover, the flow of each program described in the above exemplary embodiment (see FIG. 8 and FIG. 9) is one example, and unwanted steps may be omitted therefrom and new steps may be added thereto in a scope that does not depart from the gist of the present invention.

What is claimed is:

1. A sensing device comprising:

a magnetic field generating coil that generates an alternating magnetic field in a sensing-target region;

a signal inducing coil in which is induced an electric signal corresponding to the alternating magnetic field generated by the magnetic field generating coil;

an amplifier that amplifies a third electric signal obtained from the difference between a first electric signal induced in the signal inducing coil in a state where a sensing-target magnetic body is present in the sensing-target region and a second electric signal induced in the signal inducing coil in a state where the magnetic body is not present in the sensing-target region; and a sensing unit that senses, on the basis of the third electric signal amplified by the amplifier, the magnetic body passing through the sensing-target region by sensing a change in the alternating magnetic field resulting from magnetization reversal of the magnetic body.

2. The sensing device according to claim 1, wherein the amplifier amplifies the third electric signal obtained by the first electric signal and the second electric signal being superimposed in a state where the sign of the second electric signal has been reversed.

3. The sensing device according to claim 1, wherein the second electric signal is obtained in a case where the electric signal outputted from the amplifier is equal to or less than a predetermined threshold value.

4. The sensing device according to claim 2, wherein the second electric signal is obtained in a case where the electric signal outputted from the amplifier is equal to or less than a predetermined threshold value.

5. The sensing device according to claim 1, further comprising a detecting unit that detects passage of a moving body in the sensing-target region, wherein the second electric signal is obtained in a case where passage of the moving body is not being detected by the detecting unit.

6. The sensing device according to claim 2, further comprising a detecting unit that detects passage of a moving body in the sensing-target region, wherein the second electric signal is obtained in a case where passage of the moving body is not being detected by the detecting unit.

7. The sensing device according to claim 1, wherein the second electric signal is stored in a storage unit beforehand as digital data.

8. A non-transitory computer-readable storage medium storing a computer program causing a computer to execute a sensing method comprising:

storing, in a storage unit beforehand as digital data, a second electric signal that a signal inducing coil in which is induced an electric signal corresponding to an alternating magnetic field generated by a magnetic field generating coil that generates the alternating magnetic field in a sensing-target region has induced in a state where a sensing-target magnetic body is not present in the sensing-target region;

amplifying, with an amplifier, a third electric signal obtained from the difference between a first electric signal induced in the signal inducing coil in a state where the magnetic body is present in the sensing-target region and the second electric signal represented by the digital data stored beforehand in the storage unit; and sensing, on the basis of the third electric signal amplified by the amplifier, the magnetic body passing through the sensing-target region by sensing a change in the alternating magnetic field resulting from a magnetization reversal of the magnetic body.

9. A sensing method comprising:

storing, in a storage unit beforehand as digital data, a second electric signal that a signal inducing coil in which is induced an electric signal corresponding to an alternating magnetic field generated by a magnetic field generating coil that generates the alternating magnetic field in a sensing-target region has induced in a state where a sensing-target magnetic body is not present in the sensing-target region;

amplifying, with an amplifier, a third electric signal obtained from the difference between a first electric signal induced in the signal inducing coil in a state where the magnetic body is present in the sensing-target region and the second electric signal represented by the digital data stored beforehand in the storage unit; and sensing, on the basis of the third electric signal amplified by the amplifier, the magnetic body passing through the sensing-target region by sensing a change in the alternating magnetic field resulting from a magnetization reversal of the magnetic body.

* * * * *